United States Patent [19]
Margave et al.

[11] 3,711,595
[45] Jan. 16, 1973

[54] CHEMICAL METHOD FOR PRODUCING DIAMONDS AND FLUORINATED DIAMONDS

[75] Inventors: John L. Margave, Houston, Tex.; Renato G. Bautista, Ames, Iowa; Peter J. Ficalora, Syracuse, N.Y.; Ramachandra B. Badachhape, Houston, Tex.

[73] Assignee: R. I. Patents, Inc., Houston, Tex.

[22] Filed: July 22, 1971

[21] Appl. No.: 165,316

[52] U.S. Cl. ......................423/446, 423/439
[51] Int. Cl. ..............................C01b 31/06
[58] Field of Search....................23/209.1, 88

[56] References Cited

UNITED STATES PATENTS 2,947,609  8/1960  Strong .......................23/209.1
3,030,187  4/1962  Eversole ....................23/209.1
3,007,772  11/1961 Olstowski ...................23/88

OTHER PUBLICATIONS

Simons "Fluorine Chemistry" Vol. 1, 1950, pages 431–433.
Chem. & Eng. News "Chlorofluorocarbons React with Aluminum" July 3, 1961, pages 44–45.

*Primary Examiner*—Edward J. Meros
*Attorney*—Bertram H. Mann et al.

[57] ABSTRACT

Diamonds, as well as fluorinated diamonds, can be produced by reacting a fluorinated carbon material, such as polytetrafluoroethylene, carbon monofluoride or polytrichlorofluoroethylene, with aluminum, magnesium or nickel at temperatures in excess of about 375°C. and pressures in excess of about 5,000 atmospheres. The preferred reaction temperature range is from about 600°C. to about 750°C. and the preferred reaction pressure range is from about 10,000 atmospheres to about 20,000 atmospheres.

17 Claims, No Drawings

CHEMICAL METHOD FOR PRODUCING DIAMONDS AND FLUORINATED DIAMONDS

LICENSE TO THE U. S. GOVERNMENT

A non-exclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

1. Field of the Invention

This invention relates generally to a chemical process for synthetically producing diamonds from fluorinated carbon compounds and metal reducing agents.

2. Description of the Prior Art

Previous methods for synthetically producing diamonds have involved the application of enormous pressures, either by static or explosive means, to carbonaceous materials, thus causing the transformation of these materials from one allotropic form to another. For example, the pressures required to produce diamonds by the static means are on the order of at least 50,000 atmospheres, while explosive means require shock waves producing 100,000 atmospheres or more. As would be expected, the cost of making diamonds by these methods is high since the apparatus for exerting such pressures or containing such explosions is quite expensive. The recovery of diamond dust from the debris of an explosion is also tedious and costly.

SUMMARY OF THE INVENTION

The object of the present invention is to provide a chemical process for producing diamonds at pressures and temperatures substantially below those of previous methods. By avoiding the use of such expensive equipment, as required in previous methods, and minimizing power requirements, the cost of synthesizing diamonds can be substantially reduced.

A further object of this invention is to produce fluorinated diamonds.

In accordance with the present invention, diamonds and fluorinated diamonds can be produced by reacting fluorinated carbon compounds, such as carbon monofluoride, polytetrafluoroethylene and polytrichlorofluoroethylene with a metal reducing agent, such as aluminum, magnesium or nickel, at a temperature of at least about 375°C. and a pressure of at least about 5,000 atmospheres. To avoid the possibility of a pressure build-up and explosion, it is preferred that the temperature and pressure be raised slowly, for at least about 20 minutes for temperatures up to about 675°C. and for at least about 2 hours at higher temperatures. The preferred reaction temperature is in the range from about 600°C. to about 750°C. and the preferred reaction pressure is in the range from about 10,000 atmospheres to about 20,000 atmospheres.

DESCRIPTION OF PREFERRED EMBODIMENTS

The present invention is the first known method for synthetically producing diamonds by means of a chemical reaction. Previous methods for making diamonds have involved transforming carbonaceous materials from one allotropic form to another by the application of extremely high pressures and temperatures, either by static or explosive means.

It has been discovered that diamonds, as well as fluorinated diamonds, can be produced at substantially reduced temperatures and pressures, as compared with previous methods, by reacting a fluorinated carbon compound with a metal reducing agent. Fluorinated carbon compounds as used herein means compounds that always contain some fluorine atoms but which in addition may contain hydrogen or other halogen atoms.

The fluorinated carbon compounds which have been used for synthetically producing diamonds according to this invention include polytetrafluoroethylene, polytrichlorofluoroethylene, polyvinylidene fluoride and polyvinyl fluoride and carbon monofluoride. The carbon monofluoride should preferably have a superstoichiometric fluorine-to-carbon ratio. Superstoichiometric carbon monofluoride and methods for preparing carbon monofluorides of various stoichiometries are disclosed in the copending application of J. L. Margrave, et al., Ser. No. 867,678, filed Oct. 20, 1969. No particular form of the fluorinated carbon materials is required, as diamonds and fluorinated diamonds have been produced from both solid and powdered forms of these materials.

Either aluminum, nickel or magnesium can be used to reduce the fluorinated carbon material to produce diamonds and fluorinated diamonds. Although the use of any physical form of these metals will result in the production of diamonds and fluorinated diamonds, it is preferred that the metal be in powder form of a size smaller than 40 mesh.

At a temperature of at least about 375°C. and a pressure of at least about 5,000 atmospheres, fluorinated carbon materials will react with metal reducing agents to form diamonds and fluorinated diamonds, along with fluorides of the metal used. For example, the reaction of carbon monofluoride with magnesium is as follows:

$2CF + Mg = MgF_2 + 2C$ (diamonds and fluorinated diamonds) The preferred reaction temperature ranges from about 600°C. to about 750°C. and the preferred reaction pressure ranges from about 10,000 atmospheres to about 20,000 atmospheres.

The ratio of the fluorinated carbon material to the metal reducing agent is not especially critical. For example, diamonds and fluorinated diamonds have been produced at weight ratios of polytetrafluoroethylene to magnesium ranging from 8/1 to 1/1. However, variations of this ratio changes the relative yield of diamonds as compared to fluorinated diamonds. More diamonds are formed when more of the metal reducing agent is used. When less of the metal reducing agent is used, more fluorinated diamonds are produced.

The reaction mixture is preferably heated at the desired temperature and pressure for a period of time ranging anywhere from about 1 hour to about 72 hours. Longer reaction times will usually result in the production of larger particles of diamonds and fluorinated diamonds.

The time of heating the reaction vessel to the reaction temperature can vary considerably, depending on the size of the vessel and the charge as well as on the capacity of the heating equipment. However, it is preferred that heating the reactants to the reaction temperature be done slowly, for at least about 20 minutes at reaction temperatures below about 675°C. and for at least about 2 hours at higher temperatures. Rapid heating of the sample to the reaction temperature in a shorter period of time may result in an explosive reaction but does not hinder the formation of diamonds and fluorinated diamonds.

Various types of high pressure equipment can be used in accordance with this invention. All that is required is a machine that will withstand the pressures and temperatures at which diamonds and fluorinated diamonds are formed from the reaction of the fluorinated carbon materials and the metal reducing agents. Obviously, by being able to operate at lower pressures and temperatures than prior art methods, less expensive equipment can be utilized.

The procedure for producing diamonds and fluorinated diamonds consists of first inserting the fluorinated carbon material and the metal reducing agent into high pressure equipment, slowly increasing the pressure and temperature for about a period of time from about 20 minutes to about 2 hours to the desired reaction conditions, maintaining the temperature and pressure for a period of time from about 1 hour to about 72 hours, and then cooling the equipment and reaction product to room temperature using a compressed inert gas.

The diamonds and fluorinated diamonds can be separated from the remainder of the reaction product by various methods known to the art. For example, a heavy liquid separation using bromoform can be utilized wherein the diamond and fluorinated diamond particles will settle to the bottom of the separation container while the particles of the metal fluoride and unreacted starting materials will float to the top.

As shown by the x-ray diffraction powder pattern of the reaction product, the diamond particles produced in accordance with this invention have basically the same crystalline structure and properties as naturally-occurring diamonds. Those particles in the reaction product which were identified as fluorinated diamonds have hardness and chemical properties similar to those of diamonds, but do not have the same x-ray diffraction powder pattern as that for diamonds. Fluorinated diamonds produced in accordance with this invention show an x-ray diffraction powder pattern as set forth in Table I below:

TABLE I

Front Reflection

| Line | Interplanar Spacing (Angstrom Units) |
|---|---|
| Line 1 | 4.576541 |
| 2 | 3.702246 |
| 3 | 3.559598 |
| 4 | 2.861041 |
| 5 | 2.406954 |
| 6 | 2.201376 |
| 7 | 2.076646 |
| 8 | 2.028955 |
| 9 | 1.906658 |
| 10 | 1.765293 |
| 11 | 1.668867 |
| 12 | 1.469592 |
| 13 | 1.405720 |
| 14 | 1.346509 |
| 15 | 1.253567 |
| 16 | 1.197576 |
| 17 | 1.147601 |

Back Reflection

| Line | Interplanar Spacing (Angstrom Units) |
|---|---|
| 1 | 0.784936 |
| 2 | 0.794938 |
| 3 | 0.804996 |
| 4 | 0.818230 |
| 5 | 0.853334 |
| 6 | 0.879219 |
| 7 | 0.893872 |
| 8 | 0.911184 |
| 9 | 0.933726 |
| 10 | 0.957689 |
| 11 | 1.000217 |
| 12 | 1.040869 |

The method according to the present invention can also be used to diamond-plate various graphite articles, such as rods, tubes and fibers. By placing the fluorinated carbon material and the metal reducing agent on the graphite articles and applying the necessary pressure and temperature as previously described, a film of diamond will be formed on the articles.

The following examples are illustrative of the practice of the invention and are not intended for the purposes of limitation.

EXAMPLE I

One part by weight of powdered carbon monofluoride having a fluorine-to-carbon ratio of 1.12/1.00 to 1 part by weight of 40-mesh powdered magnesium were placed inside the fired lava cylindrical cell of a high pressure tetrahedral machine. The pressure was then raised to 20,000 atmospheres and the temperature was raised to 700°C. in 1 hour and 55 minutes. This pressure and temperature were maintained for a period of 12 hours and 25 minutes, after which the reaction product was cooled to room temperature with a compressed inert gas. On analysis by x-ray diffraction, the reaction product was found to contain diamonds, fluorinated diamonds, graphite, magnesium fluoride, unreacted magnesium and carbon monofluoride. The x-ray diffraction powder pattern exhibited by the diamond particles defined a cubic crystal structure of the diamond type. The measured interplanar spacings in Angstrom units are compared with the theoretical values for natural diamonds Table II.

TABLE II

Interplanar Spacing (Angstrom Units)

| Measured | Natural Diamond |
|---|---|
| 2.0613 | 2.060 |
| 0.8983 | 0.8920 |
| 0.8261 | 0.8185 |

EXAMPLE II

One part by weight powdered carbon monofluoride having a fluorine-to-carbon ratio of 1.12/1.00 to 1 part 40-mesh powdered magnesium were placed in the fired lava cylindrical cell of a high pressure tetrahedral machine. The pressure was then raised to 6,000 atmospheres and the temperature was raised to 740°C. in 4 hours and 45 minutes. This pressure and temperature were maintained for a period of 4 hours and 25 minutes, at which time the reaction product was cooled to room temperature with a compressed inert gas. Examination of the reaction product showed the presence of diamond and fluorinated diamond particles.

EXAMPLE III

One part by weight powdered carbon monofluoride having a fluorine-to-carbon ratio of 1.12/1.00 to 2 parts powdered metallic nickel were placed in the fired lava cylindrical cell of a high pressure tetrahedral machine. The pressure was raised to 30,000 atmospheres and the temperature was then raised to 715°C. in 3 hours and 15 minutes. This pressure and temperature were maintained for a period of 1 hour and 25 minutes. Examination of the reaction product showed the presence of diamond and fluorinated diamond particles.

EXAMPLE IV

One part by weight powdered polytetrafluoroethylene to 1 part 40-mesh powdered magnesium were placed in the fired lava cylindrical cell of a high pressure tetrahedral machine. The pressure was then raised to 5,000 atmospheres and the temperature was increased to 545°C. in 27 minutes. This pressure and temperature were maintained for a period of 19 hours and 33 minutes. Examination of the reaction product showed the presence of diamond and fluorinated diamond particles.

EXAMPLE V

One part by weight powdered polytetrafluoroethylene to 1 part 40-mesh powdered magnesium were placed in the fired lava cylindrical cell of a high pressure tetrahedral machine. The pressure was then raised to 10,000 atmospheres and the temperature was increased to 535°C. in 1 hour and 10 minutes. This pressure and temperature were maintained for a period of 9 hours and 40 minutes. Examination of the reaction product showed the presence of diamond and fluorinated diamond particles.

EXAMPLE VI

Eight parts by weight solid polytetrafluoroethylene to 1 part 40-mesh powdered magnesium were placed in the fired lava cylindrical cell of a high pressure tetrahedral machine. The pressure was then raised to 40,000 atmospheres and the temperature was raised to 635°C. in 42 minutes. This pressure and temperature were maintained for a period of 20 hours and 48 minutes. Examination of the reaction product showed the presence of diamond and fluorinated diamond particles.

EXAMPLE VII

Four parts by weight solid polytetrafluoroethylene to 1 part 40-mesh powdered magnesium were placed in the fired lava cylindrical cell of a high pressure tetrahedral machine. The pressure was then raised to 20,000 atmospheres and the temperature was raised to 770°C. in 1 hour. Two minutes later the build-up of pressure inside the tetrahedral cell assembly from the rapid evolution of fluorinated gases caused the tetrahedral cell assembly to yield causing a loud explosion as the gas pressure was released. Examination of the reaction product showed the presence of diamond and fluorinated diamond particles.

EXAMPLE VIII

Three parts by weight carbon monofluoride having a fluorine-to-carbon ratio of 1.12/1.00 to 1 part aluminum powder were placed in the fired lava cylindrical cell of a high pressure tetrahedral machine. This was done for three different runs at conditions indicated in Table III.

TABLE III

| Run | Pressure(atm.) | Temperature(°C) | Time(hrs) |
|---|---|---|---|
| 1 | 36,000 | 300 | 10 |
| 2 | 30,500 | 500 | 66 |
| 3 | 36,000 | 535 | 72 |

On analysis by x-ray diffraction of the resulting products, only the products of the second and third runs were found to contain diamonds. The first run product showed only the presence of graphite.

EXAMPLE IX

A triangular length of polytrichlorofluoroethylene was placed in the fired lava cylindrical cell of a high pressure tetrahedral machine and powdered magnesium (70–80 mesh) was packed around it. This was done for five different runs at conditions indicated in Table IV.

TABLE IV

| Run | Pressure(atm.) | Temperature(°C) | Time(hrs) |
|---|---|---|---|
| 1 | 36,000 | 550 | 40 |
| 2 | 34,500 | 375 | 20 |
| 3 | 25,500 | 580 | 70 |
| 4 | 20,500 | 550 | 48 |
| 5 | 18,000 | 550 | 48 |

The products of all five runs showed the presence of diamonds on analysis by x-ray diffraction.

EXAMPLE X

One part by weight polyvinylidene fluoride to one part powdered magnesium (70–80 mesh) were placed in the fired lava cylindrical cell of a high pressure tetrahedral machine. The following set of conditions as shown in Table V resulted in the production of diamonds as shown by x-ray diffraction patterns.

TABLE V

| Run | Pressure(atm.) | Temperature(°C) | Time(hrs) |
|---|---|---|---|
| 1 | 35,000 | 565 | 47 |
| 2 | 32,500 | 500 | 70 |
| 3 | 19,000 | 550 | 24 |

EXAMPLE XI

From a sheet of polyvinyl fluoride was cut a long narrow piece which was rolled into a small cylinder. This was placed in the fired lava cylindrical cell of a high pressure tetrahedral machine and powdered magnesium (70–80 mesh) was packed around it. The following set of conditions as shown in Table VI resulted in the production of diamonds as shown by x-ray diffraction patterns.

TABLE VI

| Run | Pressure(atm.) | Temperature(°C) | Time(hrs) |
|---|---|---|---|
| 1 | 22,000 | 625 | 70 |
| 2 | 26,000 | 675 | 68 |
| 3 | 30,000 | 580 | 47 |

Various sizes of diamond and fluorinated diamond particles can be produced in accordance with this invention. The smallest particles of diamonds and fluorinated diamonds can be used in abrasive products, such as in grinding or polishing pastes and powders. Larger particles can be used in the manufacture of cutting tools and drill bits. The largest diamond particles may be used as gems in jewelry and other ornamental articles.

It will be obvious to persons skilled in the art that minor variation in the procedures of this invention may be used to produce diamond and fluorinated diamond particles in addition to those specifically set forth herein, and that changes and modifications of the invention can be made. Insofar as such variations and modifications incorporate the true spirit of this invention, they are intended to be included within the scope of the appended claims.

We claim:

1. A method for making diamonds which comprises:
   a. placing a fluorinated carbon compound and a metal selected from the class consisting of aluminum, magnesium and nickel in an enclosed chamber;
   b. subjecting the fluorinated carbon compound and the metal to a pressure of at least about 5,000 atmospheres and to a temperature of at least about 375°C. for a time sufficient to form diamond; and
   c. recovering the diamond so formed.

2. The method according to claim 1 wherein the fluorinated carbon compound is polytetrafluoroethylene.

3. The method according to claim 1 wherein the fluorinated carbon compound is carbon monofluoride.

4. The method according to claim 1 wherein the fluorinated carbon compound and the metal are subjected to a temperature between about 600°C. and about 750°C. and to a pressure between about 10,000 atmospheres and about 20,000 atmospheres.

5. The method according to claim 1 wherein the pressure and the temperature to which the fluorinated carbon compound and the metal are subjected are slowly increased for at least about 20 minutes and maintained for at least about one hour.

6. The method according to claim 1 wherein the fluorinated carbon compound is polytetrafluoroethylene and the metal is magnesium.

7. The method according to claim 1 wherein the fluorinated carbon compound is superstoichiometric carbon monofluoride and the metal is magnesium.

8. The method according to claim 1 wherein the fluorinated carbon compound is superstoichiometric carbon monofluoride and the metal is aluminum.

9. The method according to claim 1 wherein the fluorinated carbon compound is polytrichlorofluoroethylene and the metal is magnesium.

10. The method according to claim 1 wherein the fluorinated carbon compound is polyvinylidene fluoride and the metal is magnesium.

11. A method for making diamonds and fluorinated diamonds which comprises:
    a. placing a fluorinated carbon compound and a metal selected from the class consisting of aluminum, magnesium and nickel in an enclosed chamber;
    b. subjecting the fluorinated carbon compound and the metal to a pressure of at least 5,000 atmospheres and to a temperature of at least about 375°C. for a time sufficient to form diamond; and
    c. recovering the diamonds and fluorinated diamonds so formed.

12. The method according to claim 11 wherein the fluorinated carbon compound is polytetrafluoroethylene.

13. The method according to claim 12 wherein the metal is powdered magnesium and the polytetrafluoroethylene is a powder.

14. The method according to claim 11 wherein the fluorinated carbon compound is superstoichiometric carbon monofluoride and the metal is powdered magnesium.

15. A method for making diamonds and fluorinated diamonds which comprises:
    a. placing a fluorinated carbon compound and a metal selected from the class consisting of aluminum, magnesium and nickel in an enclosed high-pressure chamber;
    b. increasing the pressure in the chamber to at least about 5,000 atmospheres and the temperature between about 375°C. and about 675°C. in a period of time of at least about 20 minutes;
    c. maintaining the pressure and temperature in the chamber for a period of time of at least about 1 hour; and
    d. recovering the diamonds and fluorinated diamonds so formed.

16. The method according to claim 15 wherein the fluorinated carbon is polytetrafluoroethylene and the metal is magnesium.

17. The method according to claim 15 wherein the temperature in the container is increased to a temperature in the range from about 600°C. to about 750°C. and the pressure in the container is increased to a pressure in the range from about 10,000 atmospheres to about 20,000 atmospheres in a period of time of about 2 hours.

* * * * *